(12) United States Patent  (10) Patent No.: US 8,381,954 B2
Liao                      (45) Date of Patent:     Feb. 26, 2013

(54) SCOREBOARD STRUCTURE FOR GOLF CARTS

(75) Inventor: Gordon Liao, Yung Kang (TW)

(73) Assignee: Unique Product & Design Co., Ltd., Tainan Hsien (TW)

( * ) Notice: Subject to any disclaimer, the term of this patent is extended or adjusted under 35 U.S.C. 154(b) by 19 days.

(21) Appl. No.: 13/047,898

(22) Filed: Mar. 15, 2011

(65) Prior Publication Data

US 2012/0234880 A1    Sep. 20, 2012

(51) Int. Cl.
*B60R 9/00* (2006.01)
(52) U.S. Cl. .................. 224/274; 224/918; 224/277
(58) Field of Classification Search .............. 224/274, 224/453–456, 277, 282, 544, 549, 564, 918, 224/183, 409, 411, 553; 473/283; 280/47.24, 280/47.315, DIG. 6; 108/40, 41, 151, 124; 281/45

See application file for complete search history.

(56) References Cited

U.S. PATENT DOCUMENTS

| | | | | |
|---|---|---|---|---|
| 2,784,757 A * | 3/1957 | Bosca et al. | ............ | 150/138 |
| 3,156,000 A * | 11/1964 | Westhoff | ............ | 15/104.92 |
| 5,086,960 A * | 2/1992 | Schwietzer | ............ | 224/277 |
| 5,848,742 A * | 12/1998 | Wang | ............ | 224/274 |
| 6,059,158 A * | 5/2000 | Hsu | ............ | 224/274 |
| D462,820 S * | 9/2002 | Liao | ............ | D34/27 |
| 2010/0116697 A1* | 5/2010 | Gonazlez | ............ | 206/216 |

* cited by examiner

*Primary Examiner* — Justin Larson
*Assistant Examiner* — Corey Skurdal
(74) *Attorney, Agent, or Firm* — Alan Kamrath; Kamrath IP Lawfirm, P.A.

(57) ABSTRACT

A scoreboard structure for golf carts includes a base disposed at the middle of a handlebar of a golf cart and having a chamber; and a scoreboard pivotally mounted onto the base and having a latch member and an elastic clamp disposed on an external side of the scoreboard. A writing board is installed on an internal side of the scoreboard. An upper end of the writing board is coupled to the scoreboard, and a lower end of the writing board has a latch member and an elastic plate. The latch member is provided for latching a magnet disposed on the internal side of the scoreboard, and the elastic plate is provided for pressing a piece of paper and writing a score on the paper.

4 Claims, 7 Drawing Sheets

SCOREBOARD STRUCTURE FOR GOLF CARTS

BACKGROUND OF THE INVENTION

1. Field of the Invention

The present invention relates to a scoreboard structure for golf carts and, more particularly, to a scoreboard structure that allows users to write scores on an external side of a scoreboard and that includes a writing board installed on an internal side of the scoreboard for pressing a piece of paper and writing the scores on the paper.

2. Description of the Related Art

Most conventional scoreboard structures for golf carts include a scoreboard 10 installed at the middle of a handlebar of a golf cart as shown in FIG. 1. An end (or a bottom end) of the scoreboard 10 is pivotally mounted onto a base 1, and a latch member 11 is disposed at another end of the scoreboard and latched onto a cavity block 12 of the base 1. The latch member 11 has an elastic clamp 13 coupled thereon for pressing a piece of paper (memo) and writing a score on the paper.

However, the paper is exposed from an external side of the scoreboard 10. Thus, the paper may not be available or useful if the paper is blown off by wind or gets wet by rain, and users find it inconvenient to write the score. Obviously, the conventional scoreboards for golf carts require improvements.

SUMMARY OF THE INVENTION

Therefore, it is a primary objective of the present invention to overcome the shortcomings of the prior art by providing a scoreboard structure for golf carts. The scoreboard structure of the present invention allows users to write the score on an external side of a scoreboard and includes a writing board installed on an internal side of the scoreboard, such that a piece of paper can be pressed and provided for writing the score.

To achieve the foregoing objective, the present invention provides a scoreboard structure for golf carts comprising: a base disposed at the middle of a handlebar of a golf cart and having a chamber; and a scoreboard pivotally mounted onto the base and having a latch member and an elastic clamp disposed on an external side of the scoreboard. A writing board is installed on an internal side of the scoreboard. An upper end of the writing board is coupled to the scoreboard, and a lower end of the writing board has a latch member and an elastic plate. The latch member is provided for latching a magnet disposed on the internal side of the scoreboard, and the elastic plate is provided for pressing a piece of paper and writing a score on the paper.

DETAILED DESCRIPTION OF THE PREFERRED EMBODIMENTS

Figure 1:
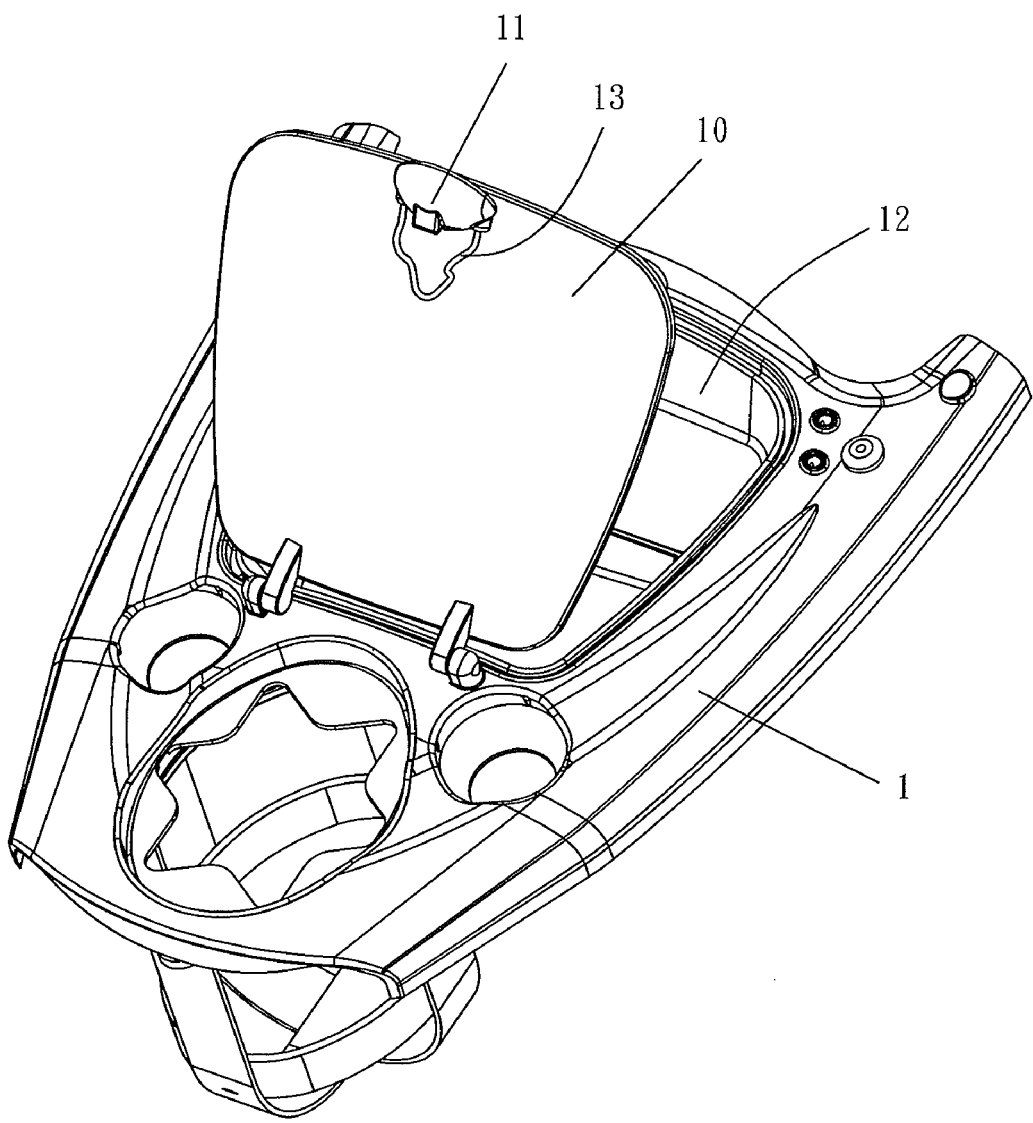
FIG. 1 is a perspective view of a conventional golf scoreboard.
Figure 2:
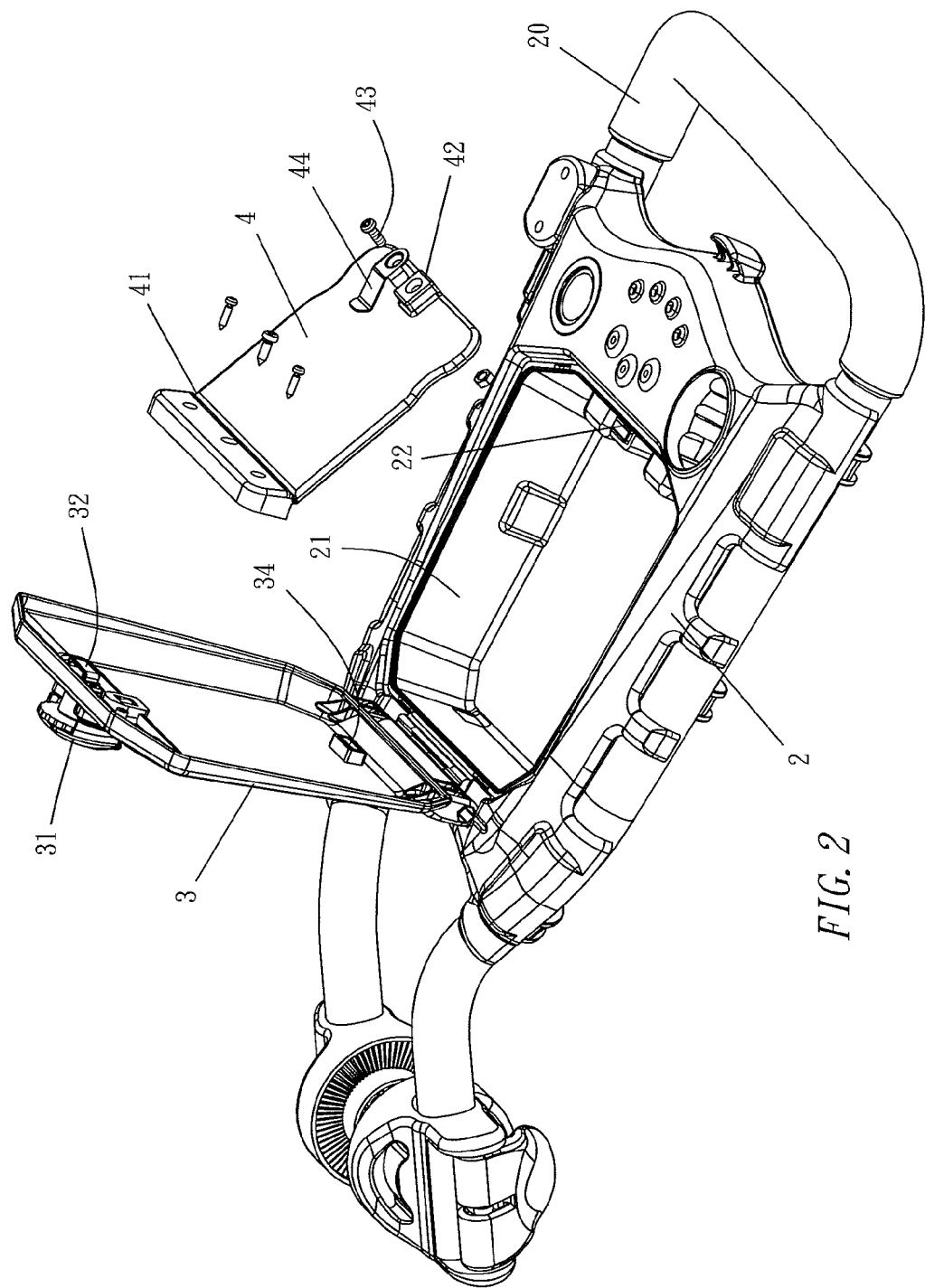
FIG. 2 is an exploded view of the present invention.
Figure 3:
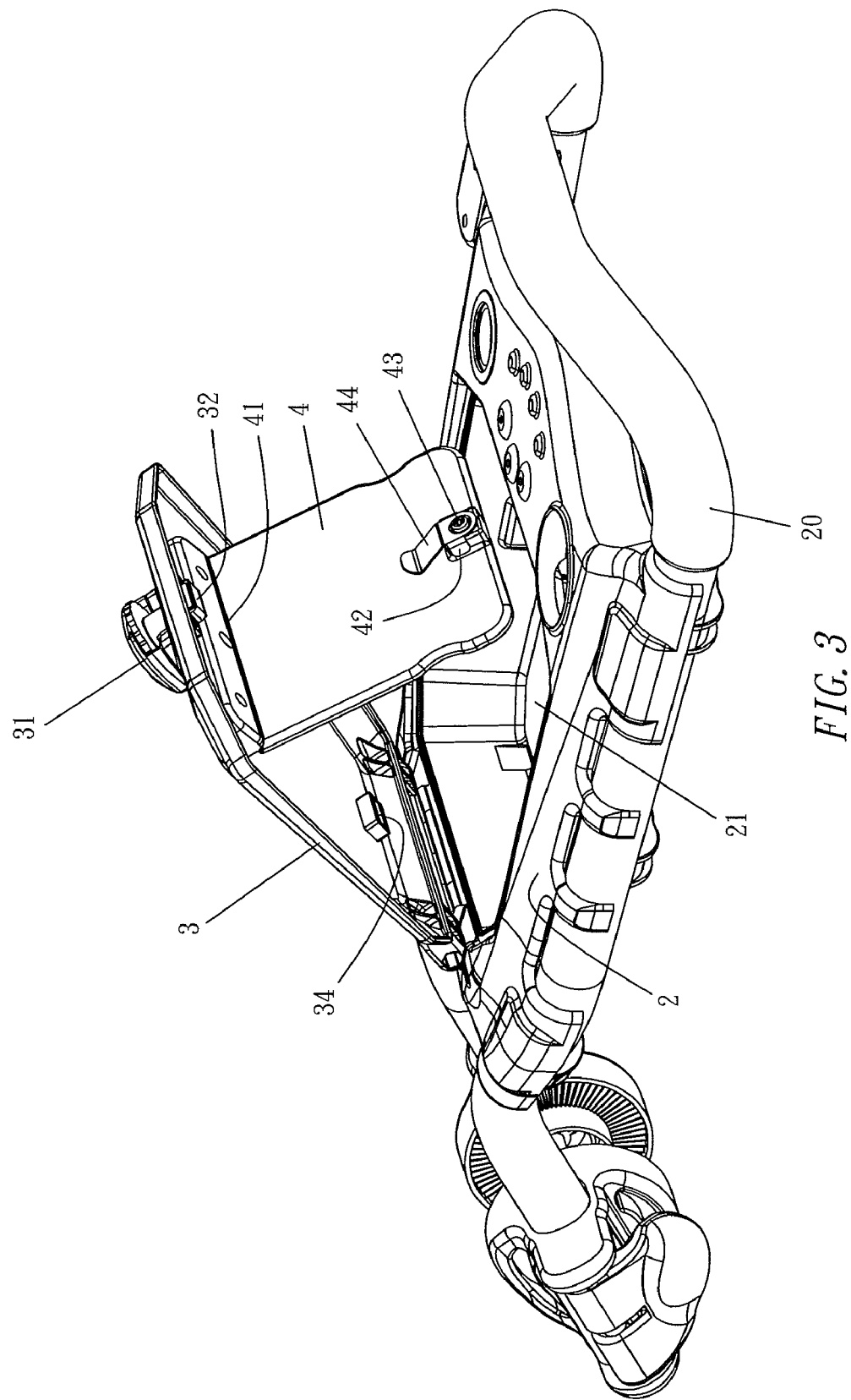
FIG. 3 is a perspective view of opening a scoreboard and a writing board of the present invention.
Figure 4:
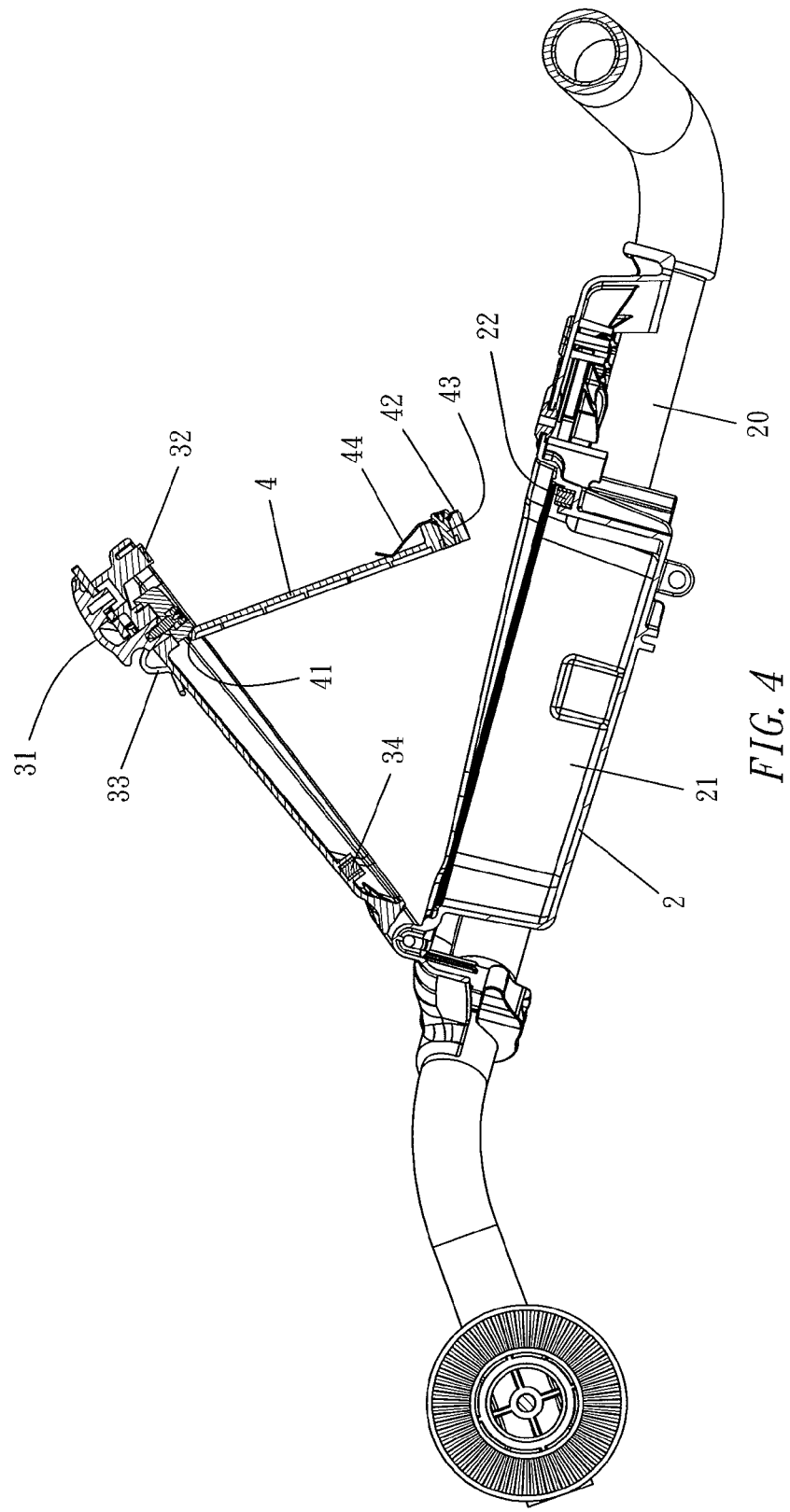
FIG. 4 is a cross-sectional view of opening a scoreboard and a writing board of the present invention.

To make it easier to understand the technical characteristics and measures of the present invention to achieve the aforementioned objectives and effects, preferred embodiments with related drawings for the detailed description of the present invention follow. With reference to FIGS. 2 to 4, a scoreboard structure for golf carts in accordance with the present invention includes a base 2 disposed at the middle of a handlebar 20 of a golf cart. The base 2 has a chamber 21 formed thereon and provided for storing personal items, and a magnet 22 is buried at an end of the chamber 21.

A scoreboard 3, substantially the same as a conventional scoreboard, has an end pivotally mounted onto the base 2. The scoreboard 3 has a latch member 31 disposed on an external side of another end of the scoreboard 3. A metal member 32 is disposed at the bottom of the latch member 31 and attracted by the magnet 22. An elastic clamp 33 is coupled to the latch member 31 for pressing a piece of paper and writing a score on the paper.

A writing board 4, installed on an internal side of the scoreboard 3, is also a scoreboard, but is called as the writing board for the purpose of simplifying the description of the invention. An end (upper end) of the writing board 4 is coupled to an internal side of the scoreboard 3. The writing board 4 has a folded portion 41 formed at a position proximate to the latch member 31 for bending or folding the writing board 4. A latch member 42 is formed on an external side at another end (upper end) of the writing board 4 and is secured to an elastic plate 44 by a screw set 43 (comprised of a bolt and a nut). The screw set 43 can be a bolt or a screw and not only secures the elastic plate 44, but also attracts an end by the magnet 34 installed at the internal side of the scoreboard 3. The elastic plate 44 can be an elastic spring plate for lifting and opening the writing board 4 and pressing a piece of paper in order to write a score on the paper.

Figure 5:
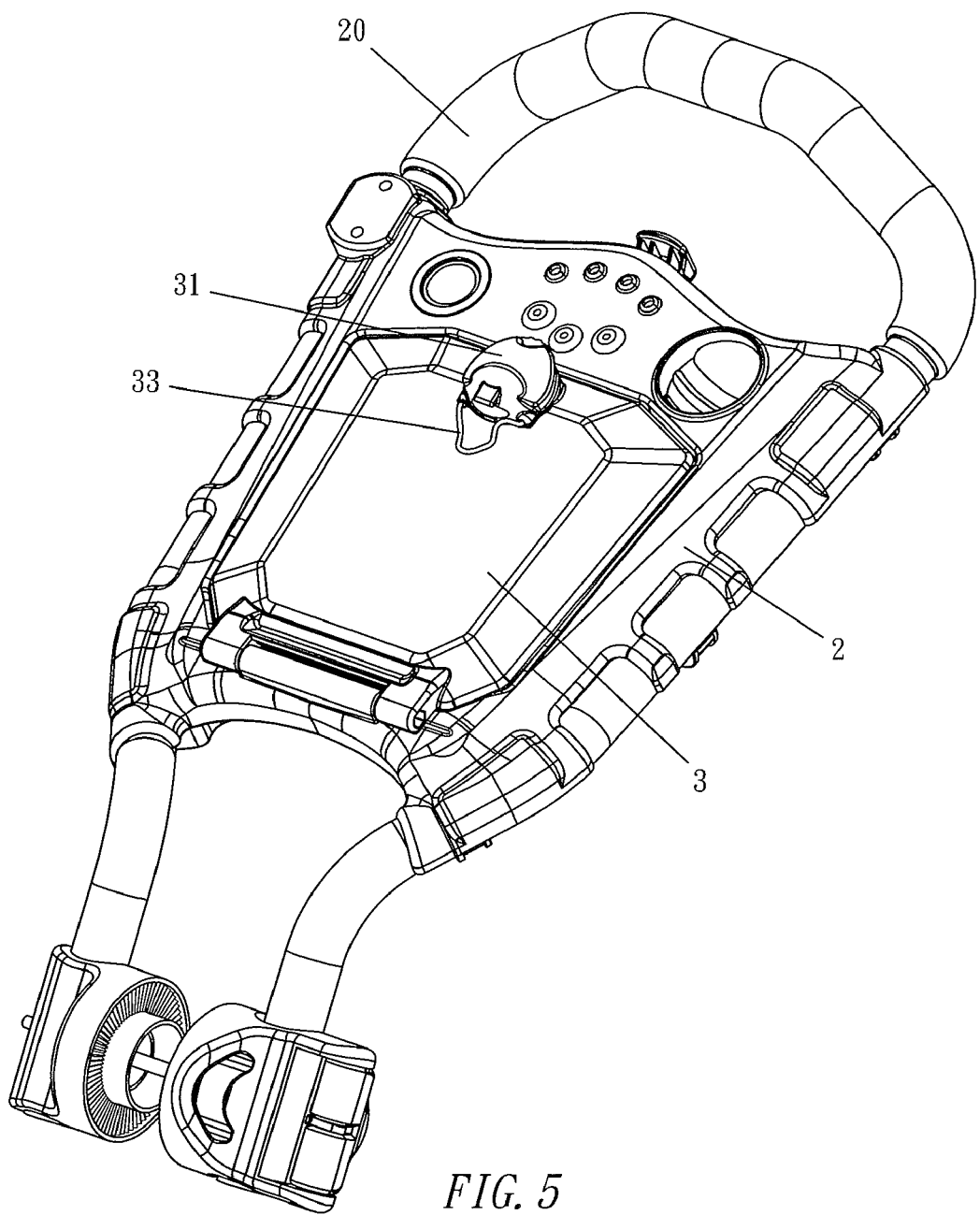
FIG. 5 is a perspective view of closing a scoreboard and a writing board of the present invention.
Figure 6:
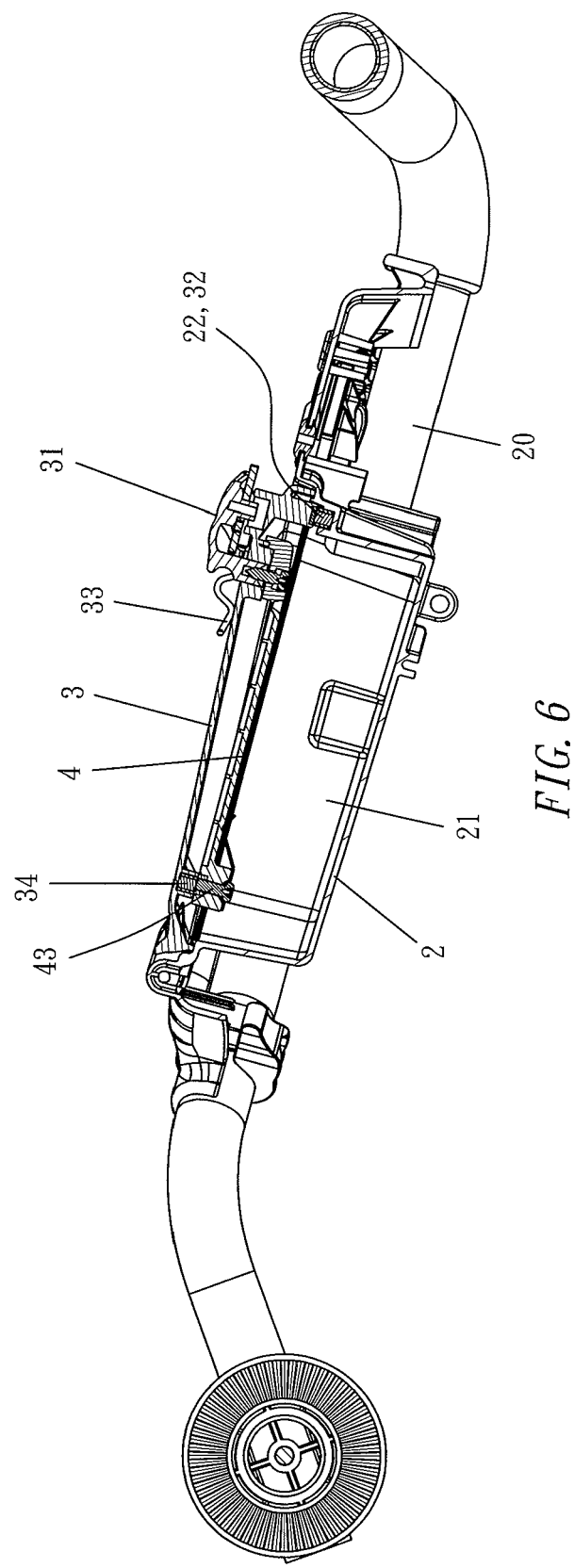
FIG. 6 is a cross-sectional view of closing a scoreboard and a writing board of the present invention.

With the aforementioned structure, when the scoreboard 3 is closed as shown in FIGS. 5 and 6, the writing board 4 is attached or attracted by the screw set 43 or the magnet 34 respectively and attached flatly on an internal side of the scoreboard 3 (which is disposed in the chamber 21). The scoreboard 3 is fixed by the attraction between the metal member 32 and the magnet 22 and covered onto the chamber 21. Now, the elastic clamp 33 installed on the external side of the scoreboard 3 is flipped slightly for pressing a piece of paper and writing a score on the paper.

Figure 7:
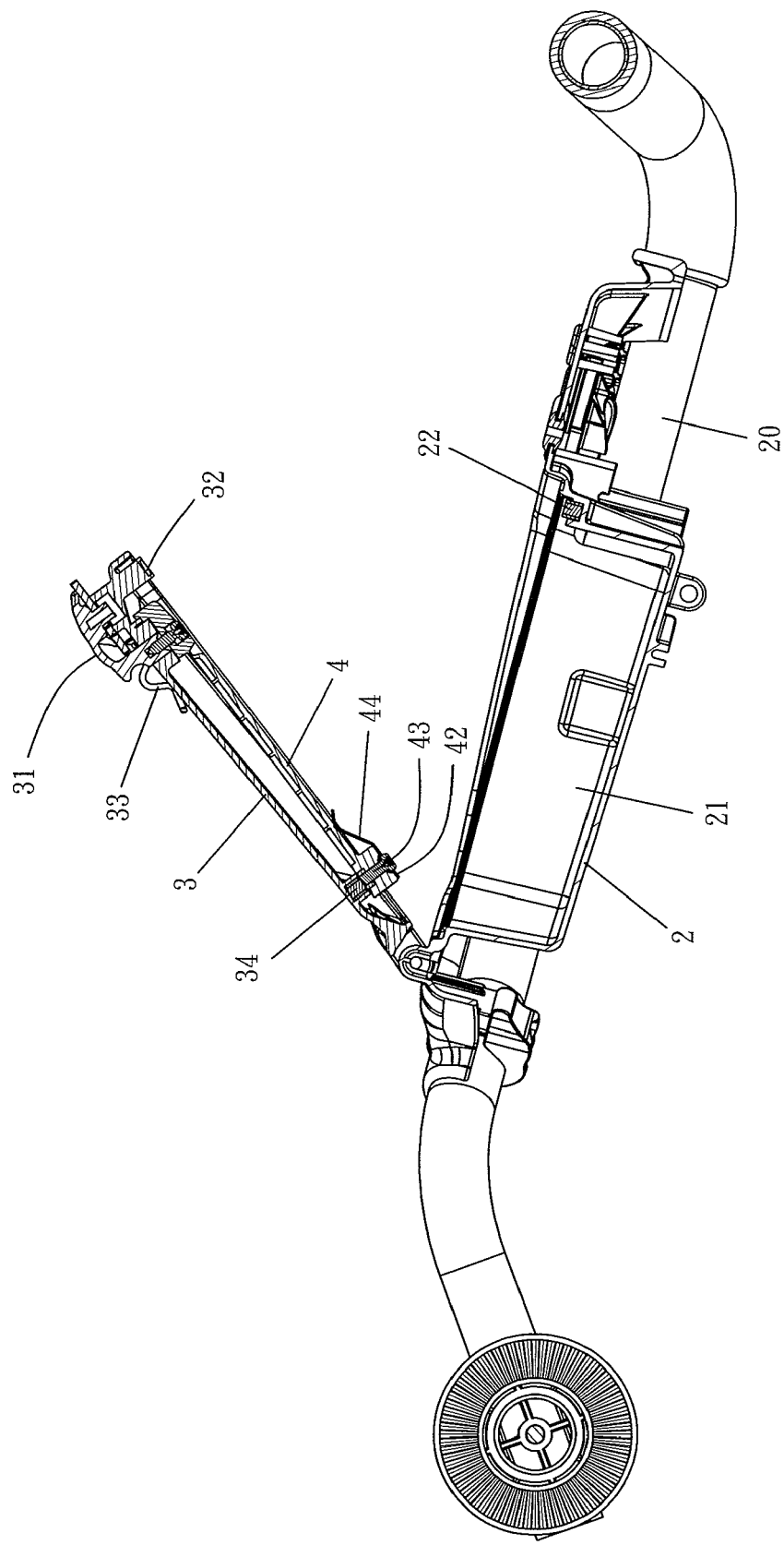
FIG. 7 is a cross-sectional view of opening a scoreboard of the present invention scoreboard.

If it is raining or the weather becomes windy and a user wants to use the writing board 4, the user flips the latch member 31 of the scoreboard 3 to separate the metal member 32 from the magnet 22, to lift the scoreboard 3 together with the writing board 4 to an angle as shown in FIG. 7. Then, the user flips the latch member 42 (or the elastic plate 44) of the writing board again to separate the screw set 43 from the magnet 34 and the folded portion 41 is provided for bending and folding to spread the writing board 4 outwardly to an angle as shown in FIGS. 3 and 4. Thereafter, the user can press a piece of paper by the elastic plate 44 to write a score on the paper.

In summation of the description above, the present invention as disclosed in the preferred embodiments of the present invention comes with a writing board 4 hidden in the internal side of the scoreboard 3 to serve as a second scoreboard 3. The scoreboard 3 and the writing board 4 can be opened to allow users to write the scores on the writing board 4 without the issue of blowing off the piece of paper by wind or getting the paper wet by rain when it is raining or the weather is windy.

Obviously, the convenient application of the present invention improves over the prior art and achieves the expected objectives and effects.

What is claimed is:

1. A scoreboard structure for golf carts, comprising:
a base adapted to be disposed at a middle of a handlebar of a golf cart, with the base having a chamber;
a scoreboard having a lower end pivotally mounted onto the base, with the scoreboard having a latch member at an upper end opposite the lower end and an elastic clamp installed on an external side of the scoreboard; and
a writing board installed on an internal side of the scoreboard, wherein an upper end of the writing board is coupled to the upper end of the scoreboard, wherein a lower end of the writing board includes a latch member and an elastic plate, wherein the latch member of the writing board is latched with the scoreboard, and wherein the elastic plate of the writing board is provided for pressing a piece of paper, wherein the upper end of the writing board is a folded portion coupled to the scoreboard, with the writing board further including a main portion pivotally connected to the folded portion, with the latch and the elastic plate of the writing board located on the main portion opposite to the folded portion.

2. The scoreboard structure for golf carts as recited in claim 1 further comprising a magnet disposed on the internal side of the scoreboard, with the latch member of the writing board latching with the magnet.

3. The scoreboard structure for golf carts as recited in claim 2, wherein the elastic plate of the writing board is a spring plate.

4. The scoreboard structure for golf carts as recited in claim 2, wherein the latch member of the writing board is a screw set.

* * * * *